United States Patent [19]
Petzoldt

[11] 3,984,905
[45] Oct. 12, 1976

[54] MULTI-SPINDLE AUTOMAT

[76] Inventor: Fritz J. G. E. Petzoldt, 6 Arnspitzstrasse, 8102 Mittenwald, Germany

[22] Filed: July 24, 1974

[21] Appl. No.: 491,561

[30] Foreign Application Priority Data
July 27, 1973 Germany............................ 2338207

[52] U.S. Cl................................ 29/38 R; 82/36 A; 408/35
[51] Int. Cl.²......................................... B23P 23/00
[58] Field of Search............... 29/38 A, 38 B, 38 R; 82/2 D, 36 A; 408/35, 42; 74/813 R

[56] References Cited
UNITED STATES PATENTS

| | | |
|---|---|---|
| 1,786,697 | 12/1930 | Bullock et al..................... 29/38.1 X |
| 2,493,206 | 1/1950 | Okey................................ 29/38 A X |
| 2,568,667 | 9/1951 | Staples........................................ 90/4 |
| 2,682,698 | 7/1954 | Berthiez............................. 408/35 X |
| 2,866,530 | 12/1958 | Charlat.............................. 408/35 X |

Primary Examiner—J. M. Meister
Assistant Examiner—W. R. Briggs
Attorney, Agent, or Firm—Walter Becker

[57] ABSTRACT

A machine having a plurality of workpiece spindles. The spindles are angularly disposed in an indexable support with the spindle axes making one and the same axis with the axis of the support and all being tangent to a common cylinder coaxial with the support axis. Means are provided for driving the spindles and chucks are mounted on one end of the spindles for carrying workpieces for cooperation with tools mounted in the frame in which the support is indexable.

14 Claims, 9 Drawing Figures

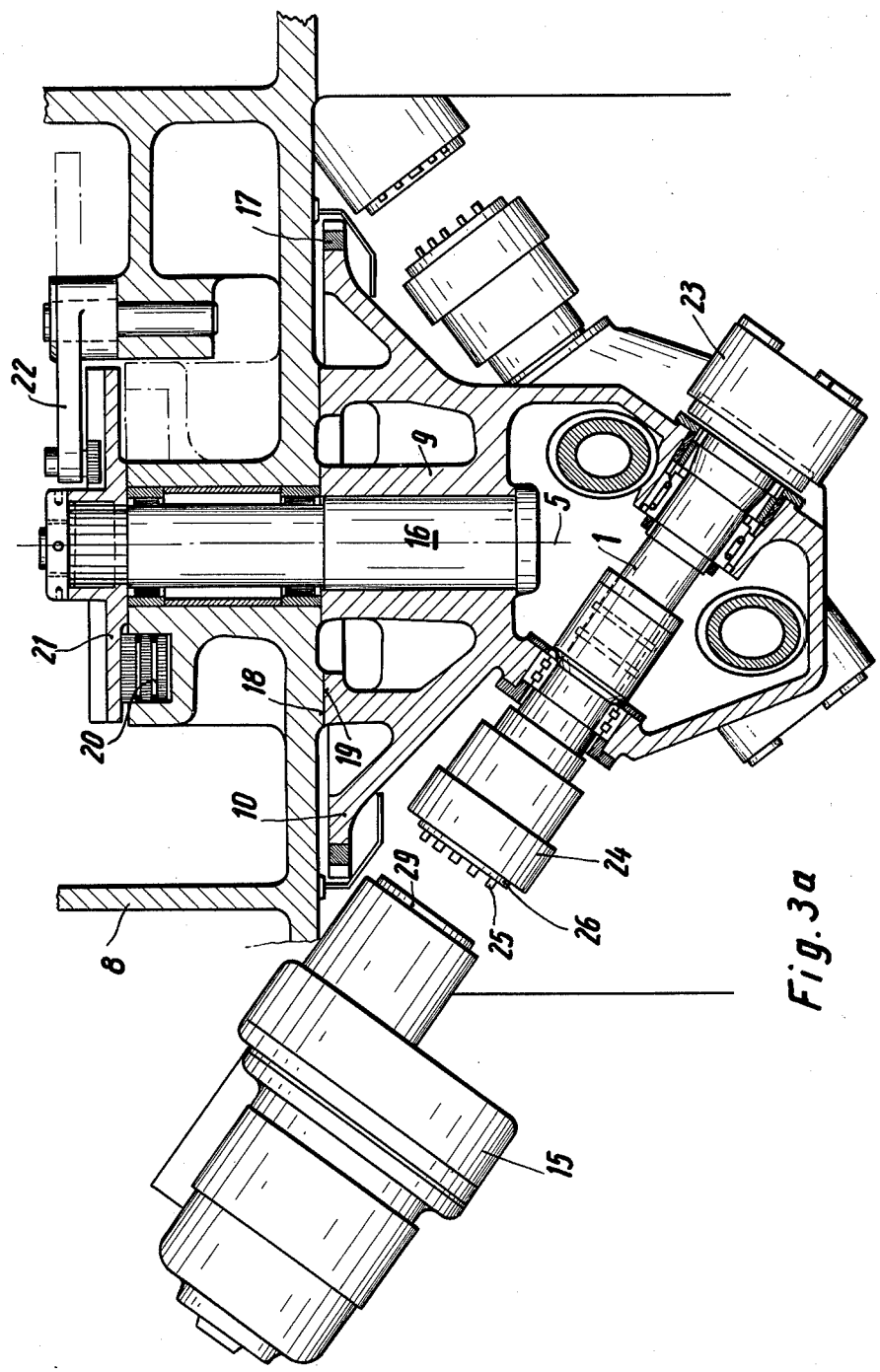

MULTI-SPINDLE AUTOMAT

The present invention relates to a multi-spindle automat, especially a multi-spindle turning automat for chuck work with a spindle support adapted to be shifted or indexed in steps and rotatable about a central axis, and more specifically concerns a multi-spindle or automatic lathe of the just mentioned type which is equipped with a plurality of workpiece spindles which are evenly spaced from each other and rotatably mounted on a common spindle carrier or support, said workpiece spindles being arranged at the same radial distance from the central axis.

With heretofore known multi-spindle turning automats of the above mentioned type, the workpiece spindles are evenly spaced or provided at even pitch and are located parallel to the axis of the spindle carrier or support which latter in most instances is designed as a cylindrical spindle drum mounted at its outer circumference in the machine housing. With these heretofore known automats, the radial distance of the individual workpiece spindle axes from the central axis of the spindle carrier or support is kept as small as possible because the outer diameter of the spindle support and consequently the weight depend on said distance. If, in contrast to the bar automats well known in the art, it is intended to machine individual workpieces which prior to being loaded in a chuck of one of the workpiece spindles are pre-processed, cast, pressed or produced as a blank in any other suitable manner, difficulties are encountered due to the fact that the maximum pivoting diameter of the workpieces must be less than the distance between two work spindles if it is to be assured that the workpieces during their turning movement or rotation will not impede each other. Therefore, it frequently occurs that a heavy machine has to be utilized even through the chip removal necessary during the machining of the workpieces could be realized with the output or power of the smaller machine; with which, however, in view of the necessary distance between the work spindles it is not possible to mount those workpieces; such workpieces while being relatively light, are bulky as far as their outer diameter is concerned.

Multi-spindle automats for chuck work have become known according to which the workpiece spindles are arranged on a spindle carrier or support designed as a circular plate or dish. The arrangement is such that the spindles extend from the axis of the spindle support radially toward the outer circumference. This means that they are arranged in a diamond fashion or star-type layout in a common plane so that the workpieces chucked at the outer end of the workpiece spindles will not impede each other even when they project to a relatively great extent with regard to the spindle axis. These designs, however, have the drawback that the overall circle measured over the chuck has to be kept rather great because it is necessary for the individual workpiece spindles respectively to provide a clamping cylinder and elements for supplying the pneumatic or hydraulic pressure medium; consequently a considerable length is necessary for the spindles. As a result thereof, undue large dimensions and a high weight of the spindle carrier or support become necessary which in turn causes long index shifting or controlling times for the spindle carrier or support.

It is, therefore, an object of the present invention to provide a multi-spindle automat or automatic chucking lathe on which it will be possible to carry out not only turning operations but also all other chip removing machining operations such as drilling, ramming, milling and also chipless machining operations at the machining stations corresponding to the number of the workpiece spindles while for the workpieces to be machined as high an overall circle diameter will be made possible in spite of an overall greatly reduced space requirement.

It is a further object of the invention to provide a multi-spindle automat as set forth above in which the mass of the spindle carrier or support including the workpiece spindles mounted on the spindle support with regard to the dimensions of the workpieces to be machined becomes considerably reduced over heretofore known designs so that the control periods or index setting times for the advance of the spindle support from a machining station can be considerably reduced.

These and other objects and advantages of the invention will appear more clearly from the following specification in connection with the accompanying drawings, in which:

FIG. 1a diagrammatically illustrates the arrangement of the workpiece spindles of a four-spindle automat according to the present invention and more specifically as viewed in the direction perpendicular to the common pivot axis 5 of the workpiece spindles.

FIG. 3a is a partial section through the spindle support and its mounting together with a front workpiece spindle and the independent drive thereof.

Figure 1A:
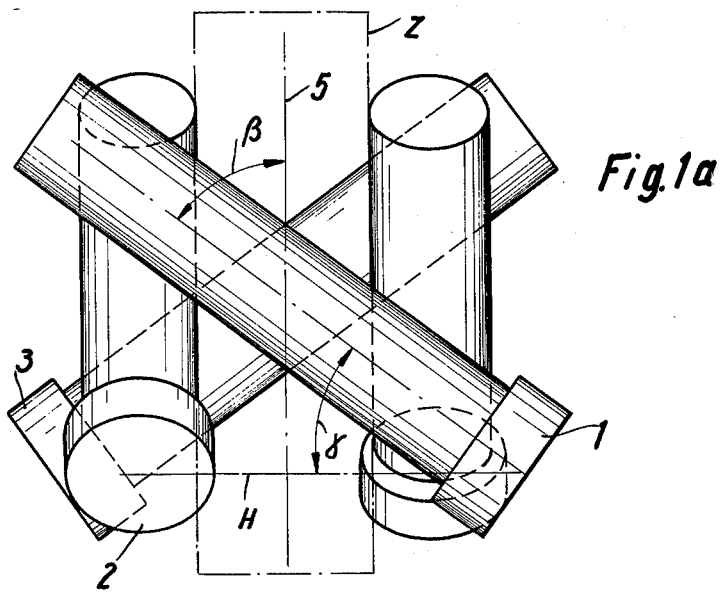
FIG. 1b shows the arrangement of the workpiece spindles of a spindle automat according to the invention as seen in the direction of the pivot axis.

The multi-spindle automat according to the present invention is characterized primarily in that axes of the workpiece spindles form an acute angle with respect to the central axis of the spindle support and are tangent to an imaginary cylinder mantle coaxial with regard to the central axis of the spindle carrier and contacting said cylinder, preferably in points which are located in a plane arranged perpendicularly to the central axis of the spindle carrier. The workpiece spindles are respectively offset or angularly positioned relative to the central axis of the spindle carrier in a circular direction with regard to each other by the same fraction of 360° in conformity with the number of spindles. The workpiece spindles can therefore move one after another during precisely indexed steps of the spindle carrier into precisely the same position relative to the machining tools provided at the individual machining stations. The contact points of the workspindle axes must be located in a common plane extending perpendicularly with regard to the central axis of the spindle carrier. For a precise machining position of a workpiece in the next machining station, it is furthermore necessary that the centers of the longitudinal abutments for the workpieces, more particularly the abutments which limit the feeding disc into the clamping means are located in the same plane and are connected in offset relationship in rotary direction relative to each other by a fraction of 360° in conformity with the number of the workpiece spindles.

The device according to the present invention above all brings about the advantage of a very compact arrangement with considerable free space for the oscillating or swing diameter for the workpiece. In view of the inclined position of the spindle axes relative to the central axes of the spindle carrier, a free accessibility for the cooling medium and the machining tools is obtained so that a highly satisfactory heat removal will be assured. The obtained chips can be withdrawn without interfering with the adjacent spindles. The compact arrangement results in a very satisfactory accessibility of the tool carriages provided at the individual machining stations. The feeding movement of said tool carriages as a rule is affected likewise in parallel with regard to the workpiece spindle axis or transverse thereto so that accordingly the guiding means for the carriages extend likewise at an incline with regard to the central axis of the spindle carrier and in view of this spacial mutually inclined position will not impede each other.

The angle defined by the individual workpiece spindles with respect to the central axis of the spindle support may amount to from 20° to 70°. These limit values have been ascertained due to the fact that the intercrossing workpiece spindles must be sufficiently spaced from each other and as the case may be must also be spaced sufficiently from a pivot or axle of the spindle carrier; this axle or pivot forms the central axis.

A particularly compact arrangement is obtained when said acute angle is in the range of approximately 45° or within the region of from 35° to 55°.

The above mentioned favorable withdrawal of the chips obtained and formed at the individual machining stations is realized particularly when the central axis of the spindle carrier is inclined downwardly or extends perpendicularly.

According to a further development of the present invention, the workpiece spindles with their two end sections may project from the bearing stations in the spindle support. In such an instance it is particularly advantageous when the downwardly pointing end section of the spindles is provided with a chuck for receiving the workpieces to be machined.

The arrangement according to the invention of the workpiece spindles at an incline with regard to the central axis of the spindle carrier, according to a further development of the invention, permits driving the workpiece spindles from the rear end section through a driving spindle and a coupling which is axially displaceable and which during the control movement of the spindle carrier can be separated from the workpiece spindle by withdrawing the driving spindle.

A compact arrangement which is particularly favorable as to space requirement is obtained when in conformity with a further development of the invention the drive of the workpiece spindles is effected by transmission shafts extending in spaced relationship to the central axis of the spindle carrier and preferably parallel to said central axis and accordingly extending vertically when the central axis is vertical. Each of these transmission shafts has a clutch which is adapted to be disengaged during the index setting or control movement of the spindle carrier. This brings about the advantage that on the workpiece spindle itself no space is required for a shiftable clutch.

When the work spindles as suggested above, project from the bearing stations in the spindle carrier, there is obtained the further possibility that for at least one, preferably for each workpiece spindle there can be provided a drive which is independent of the other spindles.

In this way, it will be possible in a simple manner to drive the individual workpiece spindles at respective different speeds suitable for the respective working operating and, if necessary, to stop the workpiece spindles for instance for carrying out milling operations.

Furthermore, according to a further development of the invention, devices may be provided by means of which for each or individual workpiece spindle or spindles the direction of rotation can be reversed and/or, if desired, a preferably stepless speed control may be effected.

A particular compact arrangement with a multi-spindle automat or automatic lathe according to the invention can be realized by driving at the same speed the transmission shafts which are preferably parallel to each other and if desired may extend vertically, directly or indirectly from a central spur gear coaxial with the axis of the spindle carrier. The arrangement according to the invention of the workpiece spindles also makes it possible to drive the transmission shafts which are parallel to each other, and which preferably mesh through bevel gears with the workpiece spindles, through the intervention of exchangeable interposed change gears, from a central main gear which is coaxial with the spindle carrier. The arrangement is such that by means of the change gears, different speeds for the individual workpiece spindles can be determined or set.

In contrast to such central drive, it is also possible according to a further development of the invention for at least one workpiece spindle to install a driving element acting directly upon the spindle and connected to the shiftable spindle carrier. Such driving element may, for instance, be an oil motor or an electric motor. The workpiece spindles which in conformity with a further development of the invention project from their rearward end section facing away from the chuck and projecting from their mounting additionally make it possible that as driving elements there may be provided transmission means such as belts, tooth belts or chains. Such transmission means act indirectly upon the spindles and are provided for the transfer of force from individual motors which are connected to the spindle support and are shiftable therewith.

Figure 1B:
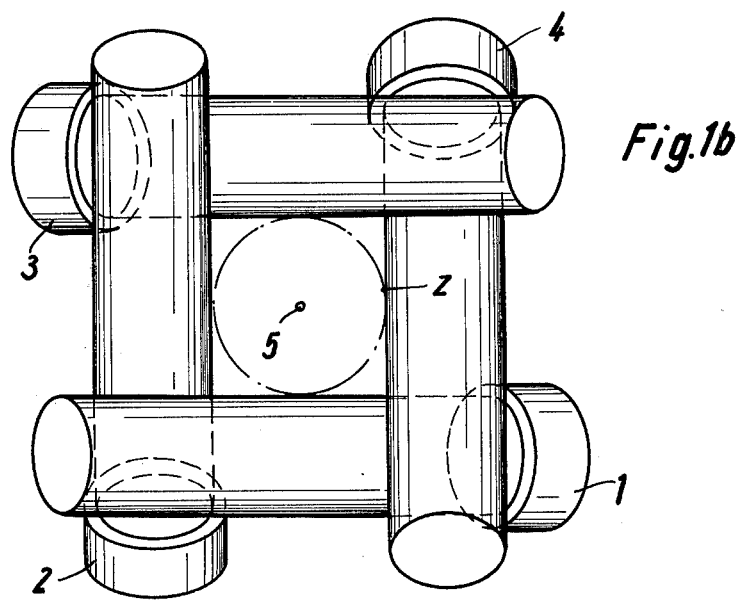

For purposes of illustrating the four-workpiece spindles illustrated in FIGS. 2–7 more clearly, FIGS. 1a and 1b show the workpiece spindles merely diagrammatically while omitting all details.

Referring now to the drawings in detail, the four-workpiece spindles 1, 2, 3 and 4 are arranged equally spaced from each other and are adapted together to pivot about an axis 5 which with the preferred embodiments in the drawings, is arranged vertically with regard to the horizontal, but may also extend at an incline with regard to the horizontal. The axes of rotation of the workpiece spindles 1-4 cross their central pivot axis 5 at uniform distances respectively at an acute angle $\beta$ of approximately 45°. The workpiece spindles are tangent to a cylinder mantle Z which is coaxial with regard to the pivot axis 5 and while being shown in FIG. 1b as an end face view is indicated by dot-dash lines in FIG. 1a.

When the pivot axis 5 of the workpiece spindles 1-4 simultaneously forms the axis of rotation of a spindle carrier referred to further below in detail is common to all workpiece spindles, and as assumed for all illustrated embodiments is arranged vertically, the axes of rotation of the work spindles respectively define with the horizontal in conformity with FIG. 1a an angle of inclination $\alpha$ which amounts to $90° - \beta = 36°$. All distances and angles of inclination are precisely the same, so that when effecting a pivot operation by 90°, each spindle is indexed or passes into the position which was occupied by the preceding spindle pivoted out of its last position, so that the individual not-illustrated machining tools can always maintain the same machining dimensions.

Figure 2:
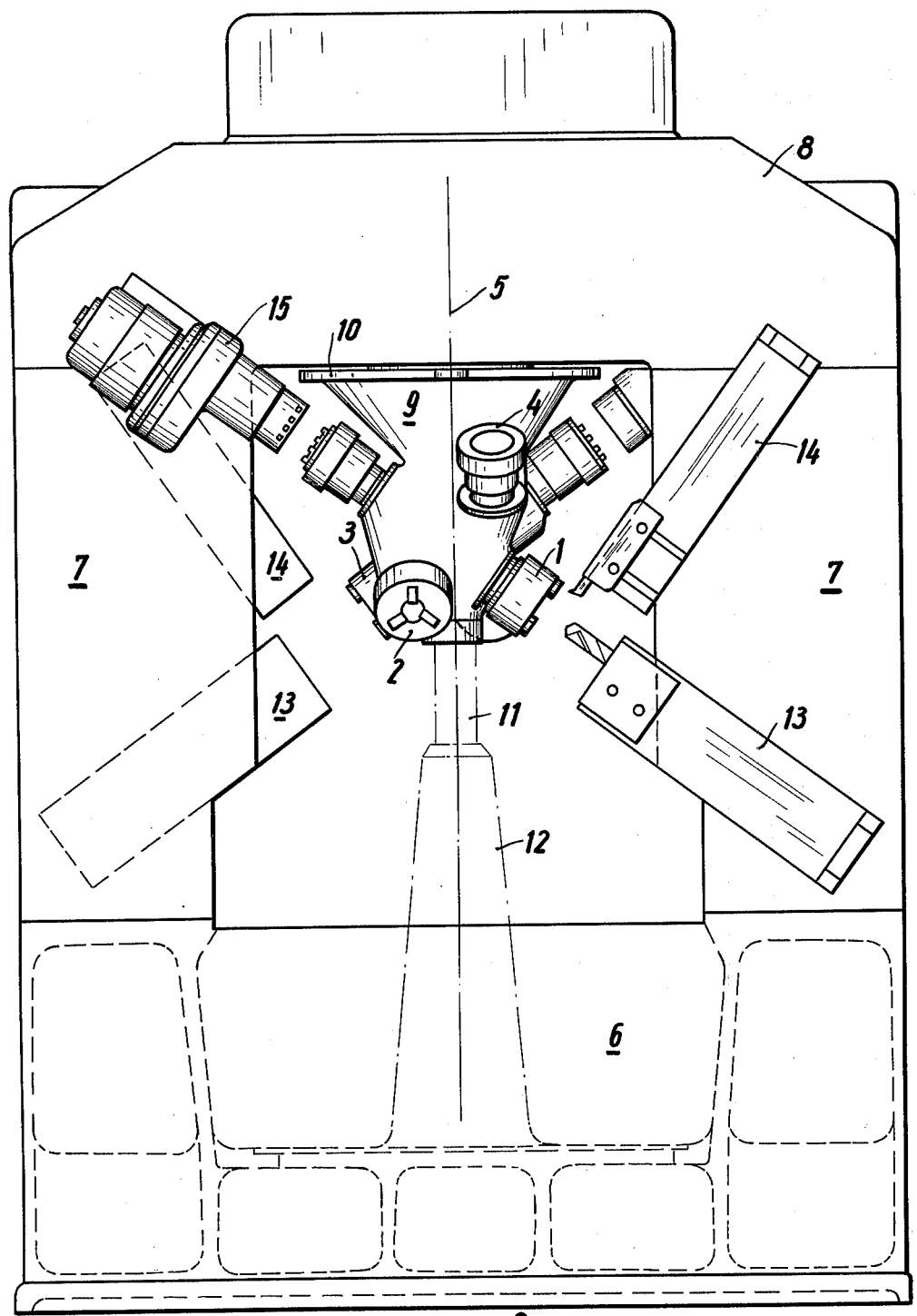
FIG. 2 is a side view of the four-spindle machine and shows an overall view thereof.

With the four-spindle machine illustrated in general by FIG. 2, the four-workpiece spindles 1-4 are rotatably journaled in the above mentioned spindle carrier 9 and are adapted to be shifted or indexed stepwise about the pivot axis 5 coaxial with the spindle carrier, from one machining station to the next machining station by 90°. A base structure 6 of the machine through the intervention of lateral stands supports a transverse spar 8 housing or having rotatably suspended thereon a spindle support or carrier 9. A flange 10 serves for arresting the spindle carrier 9 in its respective pivoted or indexing position, which position is secured by means of non-illustrated latching bolts in a manner well-known in the art.

In order during machining operations to increase the rigid mounting of the spindle carrier, the axis of said spindle carrier in a manner illustrated in dot-dash lines 11 may be extended downwardly and may be supported in a bearing 12 of the machine frame or machine base 6.

In order to be able to carry out machining operations in the axial direction of the workpiece spindles, each workpiece spindle has associated therewith one of a plurality of tool carriages 13. These carriages 13 are connected to the side stands 7 of the machine frame and carry the tools respectively intended for the individual machining operations. The tool carriages 13 by means of non-illustrated cams or oil cylinders which are clamped to chucks at the lower end of the workpiece spindle are adapted to be fed toward the respective workpiece or are adapted to be withdrawn therefrom. The chucks of the workpiece spindles in the arrangement according to the invention point at an incline downwardly and consequently assure a safe withdrawal of the chips which are formed during the machining operations and which are collected in the interior of the base 6 prior to being transported away therefrom.

In order to employ tools operating transverse to the axis of rotation of the workpiece spindles, for instance, for purposes of facing, cross slides or transverse carriages 14 are respectively arranged at the individual machining stations. These carriages 14 are likewise controlled by cams or oil cylinders. These tools can be used, not only for turning operations, but also for drilling, ramming, milling, pressing, and similar operations. Due to the considerable space available for the mounting of tools, also special tools for the generating or machining of threads, cutting in or recessing etc., as well as automatic loading or feeding devices may be provided.

Figure 3B:
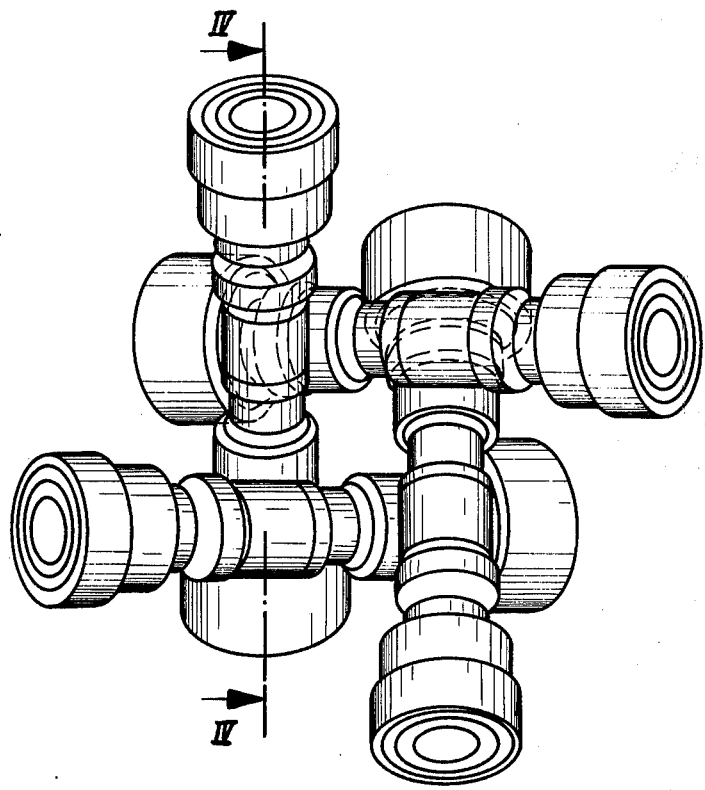
FIG. 3b is a top view of the four workpiece spindles by themselves without the spindle support.
Figure 4:
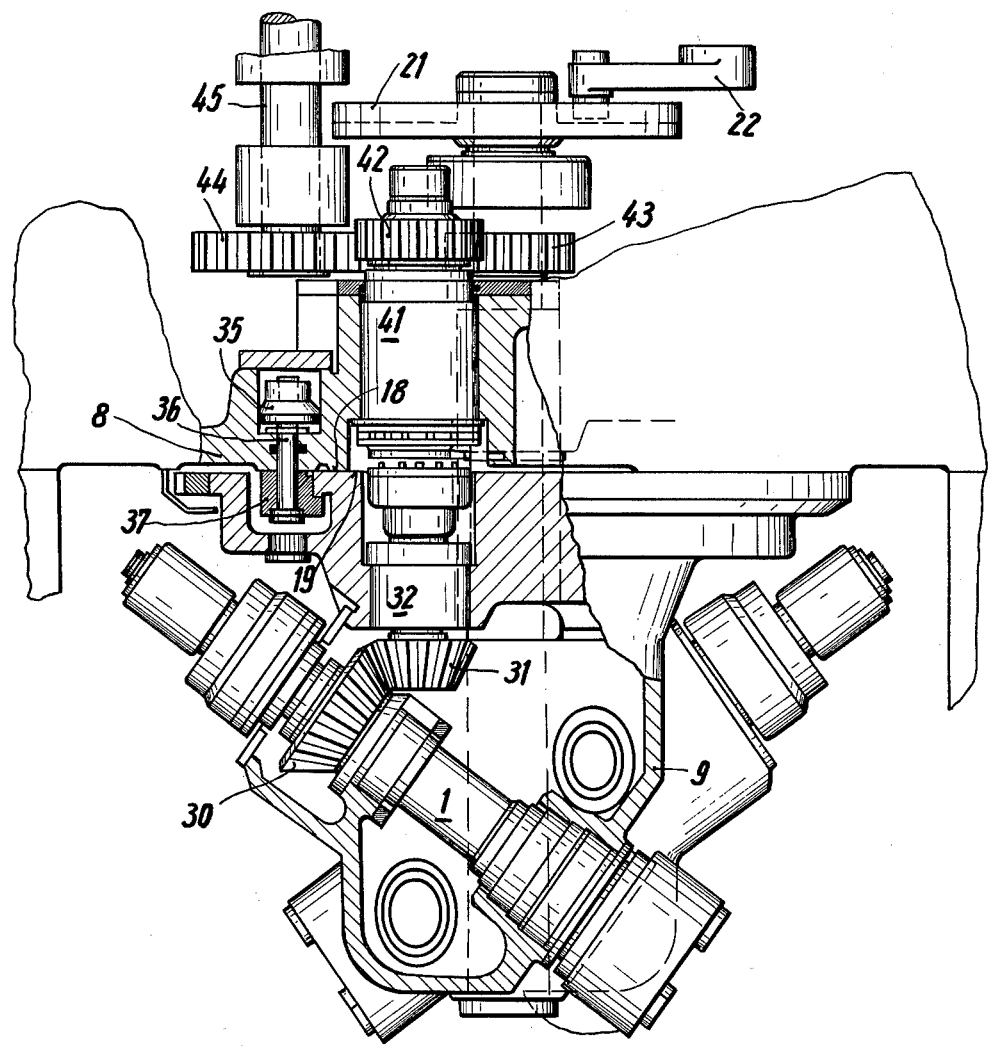
FIG. 4 is a fragmentary section taken along the lines IV—IV of FIG. 3b, said section being taken through the front workpiece spindle together with the driving arrangement for the workpiece spindle by bevel gears and through vertical transmission shaft.
Figure 5:
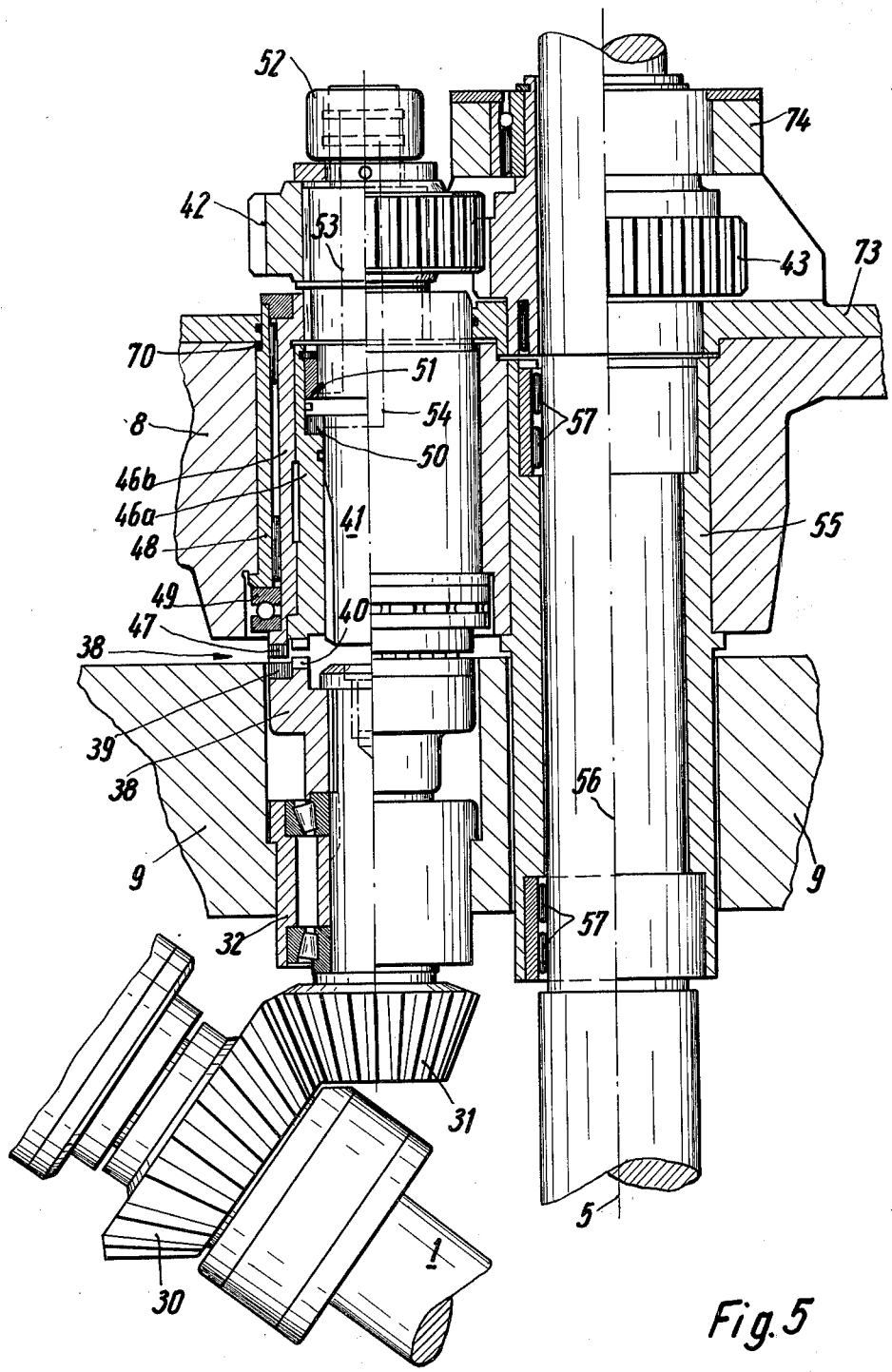
FIG. 5 is a fragmentary section through the transmission shaft of the workpiece spindle according to FIG. 4 and also represents a section through the bearing axis of the spindle carrier or support.
Figure 6:
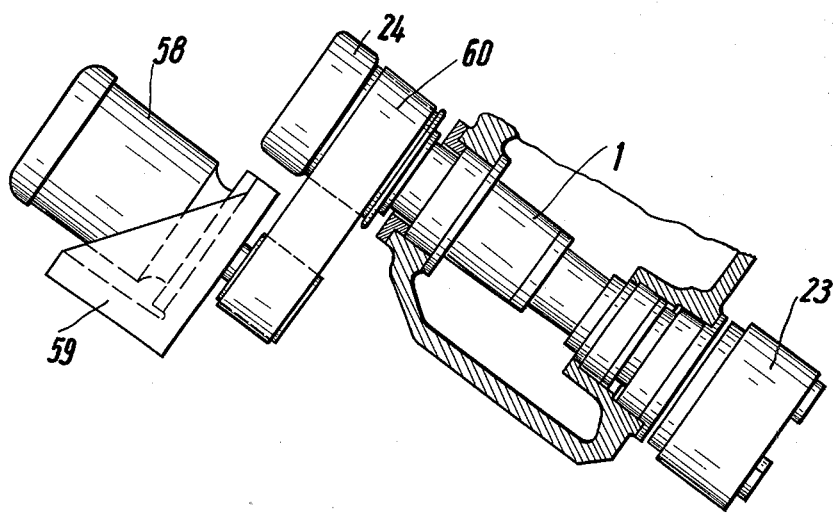
FIG. 6 is a partial section through a modified embodiment of the invention according to which the drive of the workpiece spindles is effected by an electric motor through a belt.
Figure 7:
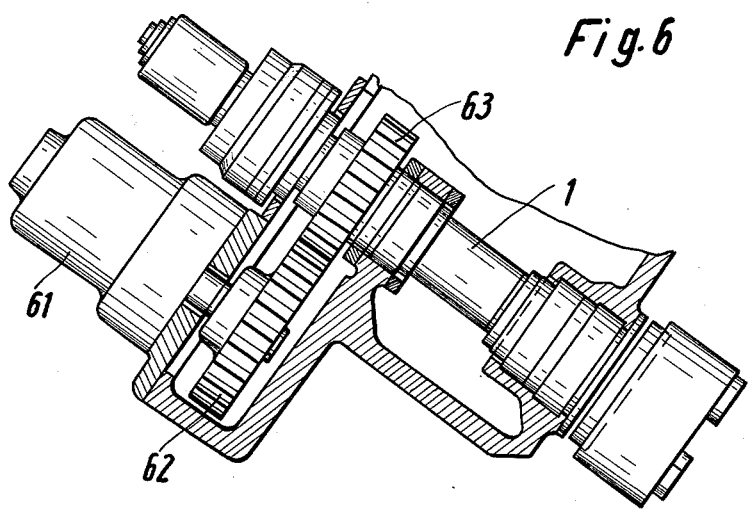
FIG. 7 is a fragmentary section through another workpiece spindle, the drive of which is effected through gears by means of an electric or oil motor connected to the spindle support.

While with the embodiment of FIGS. 4 and 5, a central drive is provided for all workpiece spindles, the embodiments of FIGS. 2, 3a and 3b, similar to the embodiments of FIGS. 6 and 7, have individual independent drives for each of the workpiece spindles. In FIGS. 2 and 3a, an independent drive motor 15 is provided for the workpiece spindle 1. This motor 15 may be connected to the column or stand 7 or spar or housing 8 and is movably controlled or adjustably positioned axially with regard to the workpiece spindle so that the driving force during the machining operation is transferred to the workpiece spindle while the driving motor is disengaged prior to the shifting of the spindle support and may be returned.

According to the fragmentary section of FIG. 3a, the spindle support or carrier 9 is connected to a vertically arranged bolt or axle 16 which is rotatably journaled in the spar or housing 8. The flange 10 of the spindle carrier 9 receives four arresting blocks 17 at a precise pitch or precisely spaced at the circumference, in which blocks non-illustrated indexing bolts or latches or pawls may be engaged in order precisely to secure the position of the spindle carrier in each machining station. Additionally, the spindle support 9, following the locking or latching operation is pressed by oil pressure with its surface 19 against the surface 18 at the bottom side of housing 8 and is held rigid during the machining operations. To this end, in the housing 8 there are provided three oil operable pistons 20 which are offset relative to each other by 120°. These pistons 20 during the machining operations are pressed against a Geneva-cross disc 21 serving for an advance shifting, and thus by this lift the spindle carrier 9 upwardly and pressed with its face 19 against face 18 of housing 8.

The disc 21 is indexed or stepwise turned each time by 90°, by means of a roller lever 22 which in a manner known per se following the disengagement of the spindle support carries out a complete revolution.

According to the illustrated embodiments, the workpiece spindles have their downwardly projecting end sections which project from the bearing zones illustrated in FIG. 3a provided with chucks of which one is indicated at 23. These chucks serve for receiving and holding the workpieces to be machined. The working spindles are equipped with suitable power clamps or chuck operating means which may be designed, for instance, as compressed oil operated cylinders 24 and which are adapted by means of non-illustrated pull rods to control the chuck jaws and hold the workpiece in the correspondingly designed chuck 23. With the illustrated embodiment of FIG. 3a, the clamping cylinder 24 simultaneously serve for transferring the driving force of the driving motor 15 to the workpiece spindles To this end, the outer ends of cylinders 24 are provide with clutch teeth 25 and with a friction lining 26 whic latter drives the spindle prior to the engagement of th clutch teeth.

The driving motor which is expediently designed as electric motor or as an oil motor is longitudinally displaceably connected in a non-illustrated prism guide or the like, and may for different machining purposes be reversed as to its turning direction, or may be stopped and may expediently be infinitely variable as to its speed.

As soon as the spindle support 9 has been shifted to its next or new working position, the driving motors 15 pertaining to the individual tool spindles are moved toward the spindle ahead thereof and in this way are positively or frictionally connected with the respective spindle. With the illustrated embodiment, for a smoother start of the spindle, first one friction lining 29 provided at the end face engages the friction lining 26 of the clamping cylinder 24 whereby the spindle is frictionally rotated. A short period thereafter, a gear clutch located behind the friction disc 29 is moved toward the clutch teeth 25 and is brought into positive connection therewith.

By the employment of individual driving motors 15 which are independent of each other, it is possible to drive each workpiece spindle 1–4 a speed of rotation which is adapted to the respective work sequence or desired machining operation at the respective machining station. If required, by a special operation, it is also possible without difficulties to provide an opposite or reversed direction of rotation of the work spindle or to stop the latter.

Instead of an individual drive, with the embodiment of FIGS. 4 and 5, there is provided a central drive which is common to all workpiece spindles. To this end, a bevel gear 30 is connected to all workpiece spindles, as shown in the drawings, for the workpiece spindle 1. The bevel gear 30 is driven by a counterwheel or meshing gear 31 which is mounted on one of four vertically journaled intermediate shafts or sleeves 32. The intermediate shafts 32 are journaled in the spindle support or carrier and therefore are indexed or shifted together with the latter to the various machining stations. The spindle support or carrier is shifted or indexed by means of a Geneva-cross disc 21 and a roller lever 22 in the manner described in connection with the embodiments of FIGS. 2 and 3. In contrast to the first embodiment, in this instance, the end face 19 of the spindle carrier 9 is pressed against the surface 18 at the lower side of the housing 8 by three compressing oil operated pistons 35 which are respectively offset by 120° relative to the axis of rotation of the spindle carrier. The cylinders pertaining to said pistons 35 are located in the housing 8. The connecting rods 36 connected to the pistons 35 respectively pull through a ring 7 during the machining operation toward the housing FIG. 5 illustrates details of the spindle drive and of the mounting of the spindle carrier in one section which extends radially in the common plane in which the axis 5 of the spindle carrier 9, one of the intermediate shafts or counter gear 31, running in sleeve 32, and the pertaining work spindle shaft 1 are located. The interwheel or counter gear 31 meshing with the bevel gear 30 of the work spindle 1 is mounted on the upper end section of one of the intermediate shafts or sleeves 32 which extend parallel to each other and parallel to the axis of rotation 5 of the spindle carrier 9. The intermediate shafts or sleeves 32 by means of conical roller bearings are guided radially and axially in the spindle carrier 9. At the upper end of each intermediate shaft or bevel drive gear there is provided a clutch 38 which is connected to the counterwheel and is adapted to establish a combined frictional and positive connection. This clutch 38 comprises a friction disc 39 as well as a plurality of clutch teeth 40. Axially, with regard to said clutch parts, one of four transmission shafts 41 is mounted in the housing 8 for each of the workpiece spindles and the intermediate shaft thereof. Each of the transmission shafts 41 which are arranged parallel to each other has its upper end provided with a spur gear 42 which permanently meshes with a central spur gear 43. It will be appreciated that due to this central spur gear 43 the drive can be derived from a central motor and can be conveyed to each of the spindles 1–4 at the same speed.

Instead of effecting the drive through a central spur gear 43 with the same spindle speed, the drive may also be effected in the manner illustrated according to FIG. 4, according to which the gears 42 of the transmission shafts 41 mesh with the driving gear 44, the vertically arranged shaft 45 of which is, in a manner known per se, driven continuously by a main drive motor, not illustrated.

According to the illustrated embodiment of FIG. 5, the transmission shaft 41 which is connected to the drive wheel 42 is designed as a splined shaft and drives the inner sleeve 46a provided with a jaw clutch, and also drives an outer sleeve 46b, the lower end of which, is equipped with a friction clutch lining 47. The sleeve 46 is rotatably journalled by means of not-illustrated needle bearings in a bushing 48 and is axially held by longitudinal ball bearings 49. The bushing 48 is slidably guided in a bore of the housing and is adapted to take along the two sleeves 46a and 46b in response to a vertical movement. This axial movement of the bushing 48 is controlled by oil pressure which through non-illustrated conduits may be conveyed into a small annular chamber 70 at the upper portion of bushing 48 and then presses the bushing 48 together with the two sleeves 46a and 46b downwardly until the frictional surfaces 39 and 47 engage each other whereby the clutch 38 becomes effective. The workpiece spindle is taken along by these sleeves with limited frictional force. By adjusting the oil pressure, the pressure at which the frictional surfaces 39 and 49 are pressed against each other and consequently the frictional force can be varied. When the workpiece spindle has reached its optimum high speed, oil under pressure is conveyed into a cylinder chamber 50 which is formed between the shaft 41 and the inner sleeve 46. In this way, the sleeve 46 is moved with its teeth moved into the jaw clutch 38 of the bevel gear 31, and more specifically, at a pressure which is sufficient to overcome the friction relative to the already moving clutch 38. In this way, the drive of the workpiece spindle is positively secured.

In order to disengage the clutch 38 prior to advancing the spindle carrier 9, oil under pressure is conveyed into the counterchamber 51 of the cylinder whereby the sleeves 46a and 46b and the bushing 48 are moved upwardly so that the clutch teeth 40 as well as the friction linings 39 and 47 are freed. The oil under pressure is conveyed to the cylinder chambers 50 and 51 by a distributor 52, and through conduit bores 53 and 54, indicated by dot-dash lines.

The clutching effected through the friction surfaces 39 and 47 may either operate alone with light machining work being done, or when introducing workpieces from a non-illustrated automatic magazine may be used for positioning the workpiece spindle or for driving the same yieldingly in a rotary elastic manner.

According to the embodiment illustrated in FIG. 5, the centrally arranged driving wheel or gear 43 serves only as intermediate gear for the driving gears 42 pertaining to the individual transmission shafts 41. The wheel or gear 43 may be mounted independently in a plate 73 and a counterbearing 74.

According to FIG. 5, bearing bushing 55 coaxially with regard to the spindle carriage 9 is pressed into housing 8. This bushing 5 serves as axial guiding means for a shaft 56 fixedly connected to a workpiece spindle carrier and furthermore serves to rotatably support shaft 56 in the housing 8. In this arrangement, the shaft 56 freely extends through the central spur gear 43 and similar to FIG. 4 has its upper end section equipped with a Geneva-cross disc 21.

FIG. 6 shows an embodiment which differs from that of FIGS. 2 and 3a and is equipped with individual drive for each of the illustrated workpiece spindles 1. In this instance, the transfer of the driving momentum is effected from an electric motor 58 which is suitably connected by bracket or bearings 59 with the spindle carrier 9, by way of a belt drive which assures a high degree of uniformity and freedom of vibration or oscillation of the spindle. The chuck operating or cylinder 24 may at the same time form a pulley over which the flat belt moves. Instead of flat belts, also V-belts or toothed belts may be utilized. A belt drive is particularly advanatageous when a fine machining is intended with maximum precision on a very fine surface of the workpieces for which purpose a gear transmission would be insufficient in view of the unavoidable degree of non-uniformity.

Instead of an electric motor, also an oil motor may be utilized particularly when infinitely variable drive is a necessity.

The modified form illustrated in FIG. 7 is provided particularly for such applications where major chip removal is necessary. In such an instance, the drive is effected by an electric or oil motor 61 through spur gears 62 and 63 to the workpiece spindle 1. The stopped or turning off and braking of this spindle according to FIGS. 6 and 7 may be effected directly by the electric motor serving as the drive or by the oil motor. Also, a right turn or left turn or reversing movement as it is necessary, for instance, when cutting thread, may in this way be realized on those sections of the spindle carrier 9 which are provided for individual machining operations.

One of the main advantages of the arrangement of the workpiece spindles according to the invention is seen in fact that the spindle carrier no longer as heretofore customary has to be mounted on the outer diameter but can be provided in the machine housing with a central axle or trunnion within bearings of close tolerance. Above all antifriction bearings may be minimized or employed so that the problems of heating up the spindle support will, for all practical purposes, have no influence upon the bearing play which, therefore, can be held very narrow or in preloaded condition. The spindle bearings provided for holding or receiving the workpiece spindles may be located advantageously close to the outer surfaces of the spindle support so that when passing a cooling medium thereover, a very satisfactory withdrawal of the spindle bearing heat will be assured. The locking of the spindle carrier may be effected above the workpiece spindles in a largely dimensioned ring extension which in its working position can be pressed by a pressure medium with its end face firmly against the machine frame thereby ensuring a rigid connection therewith.

The construction according to the invention in combination with the obtained uniform temperature distribution and maintenance assures a maximum control precision of the workpiece spindles. Moreover, due to the downwardly pointing chuck of the workpiece spindles, the chips being formed will be prevented from remaining on the workpiece supports so that they cannot interfere with the normal operation. Also, all tool slides or carriers working transverse to the spindle axis and designed as transverse carriages or cross slides may easily be so arranged that they operate from an incline from above so that the chips drop directly downwardly, and that each workpiece spindle thus will have a favorable position with regard to freedom from chips. Also, the loading or feeding of the workpieces by hand or by automatically operating devices is considerably facilitated by the work spindles which in conformity with the invention are located tangentially diamond-shaped or star-like format, because the adjacent spindles and tools will not interfere with such leading or feeding devices.

It is, of course, to be understood that the present invention is, by no means, limited to the specific showing in the drawings, but also comprises any modifications within the scope of the appended claims. Thus, as embodiments of the invention various four-spindle rotatable automats are shown. However, the invention is not limited to five and six spindle arrangements, nor to rotary operations, but is also applicable to automats for chip-removing machining operations. In such an instance, due to the placing of the workpiece spindles at an incline according to the invention the spacing of the workpiece spindles from the central axis of the spindle support can, in spite of a great pivotal movement, be kept small.

What is claimed is:

1. A multiple spindle workpiece turning automatic lathe machine having in combination a frame, said frame mounting tools disposed at plural work stations, a workpiece spindle support supported in the frame and having means for indexing between said work stations on a main axis, a plurality of workpiece spindles having workpiece holding means rotatably supported in said support, the axes of said spindles being the same radial distance from said main axis and each making the same actute angle of inclination to obtain free accessibility and greater freedom for turning rather than being close together in parallel with respect to said main axis when viewed in the direction of the common perpendicular to said main axis and the axis of the respective spindle, said spindle axes with said angle of inclination being tangent to the same cylinder coaxial with said main axis, the points of tangency of the axes of the work spindles to said cylinder being coplanar, and means to rotate said workpiece spindles.

2. A multiple spindle machine in combination according to claim 1 in which said acute angle is about from 20° to 70°.

3. A multiple spindle machine in combination according to claim 1 in whcih said acute angle is between about 40° and 60°.

4. A multiple spindle machine in combination according to claim 1 in which the axis of rotation of said support is substantially vertical.

5. A multiple spindle machine in combination according to claim 1 in which said main axis is substantially vertical and said workpiece spindles are inclined downwardly and both ends of said workpiece spindles protrude from said support, and chuck means on the lower end of each workpiece spindle.

6. A multiple spindle machine in combination according to claim 1 in which said main axis is substantially vertical and said workpiece spindles are inclined downwardly and both ends of said workpiece spindles protrude from said support, and chucks on the lower ends of at least two of said spindles.

7. A multiple spindle machine in combination according to claim 1 in which said main axis is substantially vertical, each spindle being inclined downwardly and having drive means near the upper end thereof, and clutch means associated with said drive means and disengageable during rotation of said support.

8. A multiple spindle machine in combination according to claim 1 in which said main axis is substantially vertical, each spindle being inclined downwardly and having drive means near the upper end thereof and including a shaft in said support parallel to said main axis, and a clutch for each shaft disengageable during indexing of said support.

9. A multiple spindle machine in combination according to claim 8 in which said drive means includes means for adjusting the speed of at least one of said spindles.

10. A multiple spindle machine in combination according to claim 9 in which said drive means includes means for reversing the direction of rotation of at least one spindle.

11. A multiple spindle machine according to claim 1 which includes spindle drive shafts in said support parallel to said main axis in said support and at the one end drivingly engaging respective spindles, a central gear on said main axis for driving the other end of said shafts, and change gears connecting said central gear to said shafts.

12. A multiple spindle machine according to claim 1 which includes at least one drive means on said support drivingly engaging one of said spindles, said one drive means being movable with said support during indexing of the latter.

13. A multiple spindle machine according to claim 1 which includes spindle drive shafts in said support parallel to said main axis in said support and at the one end drivingly engaging respective spindles, a central gear on said main axis for driving the other end of said shafts, a spindle gear on at least one of the spindle shaft axes meshing with said central gear, and cooperating elements of a friction clutch connected to the said spindle gear and to the said shaft and engageable for driving said shaft.

14. A multiple spindle machine according to claim 13 which includes cooperating elements of a jaw clutch connected to said spindle gear and to said shaft and engageable after said friction clutch is engaged for positively connecting said shaft to said spindle gear.

* * * * *